(12) United States Patent
Milluzzi et al.

(10) Patent No.: US 11,366,945 B2
(45) Date of Patent: Jun. 21, 2022

(54) SOFT-REAL-TIME HUB PROVIDING DATA TRANSPORT FOR PROCESSOR-IN-THE-LOOP (PIL) SIMULATIONS

(71) Applicant: DISNEY ENTERPRISES, INC., Burbank, CA (US)

(72) Inventors: Andrew Jesse Milluzzi, Kissimmee, FL (US); Robert Joseph Marra, III, Clermont, FL (US); Christopher Carl Hofer, Ocoee, FL (US); Jose Lugos Corpuz, Ocoee, FL (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 17/306,783

(22) Filed: May 3, 2021

(65) Prior Publication Data

US 2021/0256181 A1    Aug. 19, 2021

Related U.S. Application Data

(62) Division of application No. 16/398,599, filed on Apr. 30, 2019, now Pat. No. 11,010,510.

(51) Int. Cl.
  *G06F 30/20*    (2020.01)
  *G05B 19/05*    (2006.01)

(52) U.S. Cl.
  CPC ............ *G06F 30/20* (2020.01); *G05B 19/05* (2013.01)

(58) Field of Classification Search
  None
  See application file for complete search history.

(56) References Cited

U.S. PATENT DOCUMENTS 9,547,746 B1 * 1/2017 Gaudette ................ G06F 30/15
9,977,417 B2 * 5/2018 Grajetzky ............. G05B 19/05
(Continued)

FOREIGN PATENT DOCUMENTS

GB    2486136 B    12/2012
WO    2011115590 A1    9/2011

OTHER PUBLICATIONS

Automotive Solutions Systems and Applications, www.dspace.com, 2009.
(Continued)

*Primary Examiner* — Steven M Christopher
(74) *Attorney, Agent, or Firm* — Snell & Wilmer L.L.P.; Kent A. Lembke

(57) ABSTRACT

A software-based ("soft") real-time hub designed and implemented for use in simulation (or control testing) systems such as to provide a modular soft-real-time PIL. A simulation system of the present description typically may include one or more of the following useful subsystems or components: (a) a soft-real-time hub; (b) simulation interfaces; and (c) hardware emulation subsystems/devices. The soft-real-time hub is typically a combination of hardware and software adapted to provide deterministic data transport between simulations and input/output (I/O) emulation. By creating a common point, the hub enables simulation modules to be swapped out as the simulation system progresses without the operator having to worry about interface timing, forcing, or data visualization. A desirable aspect of the simulation system is it allows for testing certain conditions by forcing I/O and then seeing how the controller or system under testing responds.

20 Claims, 9 Drawing Sheets

(56) References Cited

U.S. PATENT DOCUMENTS

| | | | | |
|---|---|---|---|---|
| 2015/0242548 | A1* | 8/2015 | Jones | G05B 19/05 |
| | | | | 703/21 |
| 2017/0235859 | A1* | 8/2017 | Delisle | G06Q 10/10 |
| | | | | 703/22 |
| 2018/0060456 | A1* | 3/2018 | Phatak | G06F 9/5027 |
| 2019/0204816 | A1* | 7/2019 | Hattori | G05B 19/4183 |
| 2020/0201638 | A1* | 6/2020 | Gerzon | G06F 12/0804 |
| 2020/0349234 | A1* | 11/2020 | Hofer | G06F 30/3308 |

OTHER PUBLICATIONS

Simulace PIL—Processor in the Loop, www.rexcontrols.com/pil-simulation, Dec. 24, 2018.

PLECS PIL, Plexim Electrical Engineering Software, www.plexim.com/products/plecs_pil, Dec. 24, 2018.

Martins-Filho, Luiz S., "Processor-in-the-Loop Simulations Applied to the Design and Evaluation of a Satellite Attitude Control," Chapter 8, Intech Open Science/Open Minds, 2014, http://dx.doi.org/10.5772/57219.

"Processor-in-the-Loop Simulation, Real-Time Hardware-in-the-Loop Testing, and Hardware Validation of a Digitally-Controlled, Fuel-Cell Powered Battery-Charging Station," PESC Record, IEEE Annual Power Electronics Specialists Conference, Jul. 2004.

\* cited by examiner

SOFT-REAL-TIME HUB PROVIDING DATA TRANSPORT FOR PROCESSOR-IN-THE-LOOP (PIL) SIMULATIONS

REFERENCE TO RELATED APPLICATIONS

This application is a divisional of U.S. patent application Ser. No. 16/398,599, filed on Apr. 30, 2019, which is incorporated herein in its entirety by reference.

BACKGROUND

1. Field of the Description

The present description relates, in general, to systems and methods for testing control systems and/or control software including using processor-in-the-loop (PIL) simulations, and, more particularly, to methods and systems for providing software-based (or "soft") real-time data transport for PIL simulations with a soft-real-time hub, which may also be labeled a real-time data interconnection hub (or, more simply a real-time hub or "RTHub").

2. Relevant Background

There are many situations in which it is desirable to thoroughly and accurately test control systems including controller software. For example, amusement parks may create complex ride systems with correspondingly complex controllers, and it is useful to test operations of each controller to ensure its effectiveness in controlling the ride systems. Similarly, show systems may be provided along the length of the ride or about the travel path of its vehicles, and it is desirable to test operations of each controller used to operate the show system to verify that the show is properly provided by control of the show systems. Further, nearly any cyber-physical system may benefit from effective testing such as autonomous navigation, automated manufacturing, and aerospace systems.

One common technique for testing control systems and controllers/controller software is through the use of PIL simulations. PIL simulations leverage simulated data and a production processor (e.g., a programmable logic controller (PLC)). This arrangement is useful because it enables real-world testing of a control system. However, the use of traditional PIL simulations in testing is often considered by many to be too expensive in both hardware and labor costs to use real input/output (I/O), to wire up the system to a simulation controller, and to interface the simulation to the simulation controller. Traditional PIL simulations can also produce space and scaling issues and may be difficult to implement due to system-under-test complexity. A PM simulation may remove the I/O in favor or a cheaper, simpler, and smaller test; however, it often will then lack the communications overhead of the I/O network due to the complexity in simulating/emulating that interface. It is often tested by changing memory while the processor is running to simulate having the I/O. However, not only does this not simulate the overhead of the I/O network, but it is possible to change system execution characteristics. The potential changes are due to how the system might respond to having memory changed by another system.

Some efforts have been made to try to simplify and reduce costs associated with PIL simulations for testing control systems, but these have not been wholly successful. For example, some attempted solutions have involved manipulating I/O on the device under test by modifying memory directly, but this undesirably bypasses the timing and control afforded by the real-time I/O network. In almost all cases, each PIL simulation is a custom solution for the PLC and for the project (e.g., for the controller and system operated by the controller (or system under test)). Particularly, interface timing is tuned for the system under test, and the PIL simulation setup rarely uses a real-time interface due to the added complexity. This makes updating the PIL simulation setup or assembly expensive, time consuming, and slow. Additionally, the PLC or the simulation typically keep the timing for the overall PIL simulation. This can mask certain faults or errors and potentially add artificial control interfaces that do not exist in the actual system being tested.

SUMMARY

To address limitations with prior testing systems, a soft-real-time hub, which may also be labeled a real-time data interconnection hub (or real-time hub or "RTHub"), has been designed and implemented by the inventors for use in simulation (or control testing) systems to manage timing of the simulation and performing other unique functions. In brief, the inventors created a modular software-based (or "soft") real-time PIL that is running on a standard operation system (OS) with the simulation. A simulation system of the present description typically may include one or more of the following useful subsystems or components: (a) a software-based (or "soft") real-time hub (or RTHub); (b) simulation interfaces; and (c) hardware emulation subsystems/devices.

The soft-real-time hub is typically a combination of hardware and software adapted to provide deterministic data transport between simulations and input/output (I/O) emulation. By creating a common point and set of interfaces, the hub enables simulation modules to be swapped out as the simulation system progresses without the operator having to worry about interface timing, forcing, or data visualization. A desirable aspect of a PIL system is it allows for testing certain conditions by forcing I/O and then seeing how the controller or system under testing responds. In this regard, the new soft-real-time hub abstracts this need from each simulation, which further simplifies development of the simulations and of the controller or system under testing. The hub (or a simulation system with such a hub) is a "soft-real-time" implementation because it runs on top of an operating system (OS), which itself is not deterministic. This enables interfacing with software models that can be used without having to port to a specific system and can also interact with other custom, user-defined models. Furthermore, in the soft-real-time implementation, the soft-real-time hub logs issues without stopping for further investigation (which can be performed later or not in real-time). Since the hub is running on a standard OS, the hub's logs can easily be processed while the application is running to triage, correlate, or otherwise assess simulation performance with the system under test.

The new hub typically includes common simulation interfaces and control system interfaces. This enables the PIL-based simulation system to grow with the project. For early simulation systems or simply PILs, a high-level system simulation may be sufficient, but, as the project progresses, the new hub provides a common interface(s) to swap in a more accurate model or system-under-control simulator or simulation module. For example, a plant-model simulation (or system simulation) may provide enough information for basic vehicle cycling and riders carried numbers while a more complex model (such as a Simulink vehicle physics model or the like) may aid in simulating acceleration times and sub-system interactions for control software or a controller being tested by the simulation system.

Hardware emulation is often desired in a PIL-based simulation or testing system. This area of development is new with only a few PIL vendors trying to support simulation of I/O. However, the new hub is configured to facilitate interfacing with I/O simulation and emulation tools. Simulation is used to mimic interface functionality, but the inventors recognized this may not provide 100 percent of the functionality. Emulation, though, is more precise, where the user or system interfacing with the emulation is unable to tell if they are talking to the real component or to the emulator, and the new RTHub was designed by the inventors to focus on emulation, which is one reason it is unique. The interfacing makes simulation transparent to the processor and control software under test by a simulation system. As a result, the real-time control network is tested, and no software changes are required for the production controller or control system. With the hub and its simulation interfaces, the simulation system is configured to enable the simulation module to affect I/O without the need for a larger and more complex system. The soft-real-time nature of the hub enables a deterministic solution that mirrors the real world.

More particularly, a processor-in-the loop (PIL) system is provided for testing a control system (e.g., a controller for a park attraction with its show and ride components, control devices in a manufacturing plant, or the like). The system includes a simulation computer and, on the simulation computer, a soft-real-time hub that includes memory (or data structure) and a timing engine. The system also includes an input and output (I/O) interface emulation providing a communication link with the soft-real-time hub and adapted for communicatively coupling with the control system to provide a real-time I/O network for the control system. The system also includes a simulator, in communication with the soft-real-time hub, simulating operations of a system controllable by the control system. During system operations, the soft-real-time hub controls communications between the simulator and control system by storing data in memory and transmitting the data at a user-defined interval controlled by the timing engine. The I/O interface to the soft-real-time hub appears to the control system to be a network link to the system controllable by the control system.

In some implementations of the PIL system, the timing set by the timing engine is a time interval or step, and the time interval or step is a default value or is user-definable. The time interval or step may be determined on an ongoing basis by the timing engine and be used by the soft-real-time hub to trigger the communications to and from the control system and the simulator. Further, the timing can be dynamically updated by the timing engine querying processor speed to determine an amount of cycles to count: first performing a cycle count to determine a first waiting period and then triggering a read signal to each connector controlled by the soft-real-time hub; and second performing a cycle count to determine a second waiting period and then triggering a write signal to each connector controlled by the soft-real-time hub. Note, the read and write ticks to the hub are used to handle data coherency to reading/writing to the hub. The above discussion is directed toward how the execution of timing and processor scaling is handled, with how timing is set being a different aspect of the system. The speed of scan rate can be increased to test system response or be slowed down to test unexpected sensor delays, which is a very useful and desirable part of the hub design due to the timing being inside the hub instead of the simulator and/or PLC under test providing control.

In some cases, the soft-real-time hub provides the I/O interface with direct memory access (DMA) to access the data stored in the memory. The system often will also include a simulation graphical user interface (GUI) and a simulation interface communicatively linking the simulation GUI with the memory. Then, the soft-real-time hub provides DMA to the simulation interface to provide the simulation GUI with the data stored in the memory, whereby the simulation GUI has access to control signals generated by the control system and data generated by the simulator in response to the control signals.

The PIL system also may include a simulation control and forcing console or GUI communicatively linked to the soft-real-time hub. This GUI is operable to receive the data stored in the memory based on the timing and to provide forcing input to modify operations of the simulator to control testing of the control system. Further, the simulator may include a plurality of modular components for simulating subsystem or elements of the system controllable by the control system, and each of the plurality of modular components is separately pluggable and unpluggable to the soft-real-time hub.

DETAILED DESCRIPTION

Briefly, embodiments described herein are directed toward a soft-real-time hub (also interchangeably labeled a real-time hub (RTHub), a real-time data interconnection hub, and hub) for use in providing improved data transport for processor-in-loop (PIL) simulations and to simulation systems and methods that include or provide the functionality of the software-based (or "soft") real-time hub. The hub has been developed for use in PIL testing and was validated through simulation of operation (via simulation modules run by a simulation computer(s)) of an under-design park attraction by control software and hardware (e.g., a controller or control system).

A PIL may be run as a real-time system to provide accurate results of real world events (note, real time is desirable for greater accuracy, but the system may be utilized with other timing parameters). Prior to the new hub, some system and controller designers had used non-real-time solutions for pre-integration and visualization. The utility of non-real-time solutions, though, is limited for some applications such as for timing-critical systems and provides little or no determinism that is desired for ride engineering and other environments. Prior systems also might use modified versions of the production PLC code to self-simulate, but this can impact the real-time performance of the controller under test or add additional overhead.

Another limitation of prior PIL-based testing systems is that they have software interfacing limitations such as lacking native interfaces to provide PIL testing with I/O emulation. In contrast, simulation or testing systems that include the new soft-real-time hub provide the desired determinism (similar to a real-time operating system (OS) or PLC) without the need for custom development and with higher performance compared with prior designs. Use of the new hub also provides cost savings by eliminating the dedicated hardware requirements of many hardware-in-the-loop (HIL) systems as the hub is a software module or software-based solution that can be run on nearly any computing device (such as, but not limited to, any personal computer (PC) or workstation running Microsoft Windows or other useful OS). In some embodiments, the hub module is also written or coded in an abstract way to enable porting to another device running a differing OS such as Linux or the like.

Figure 1:
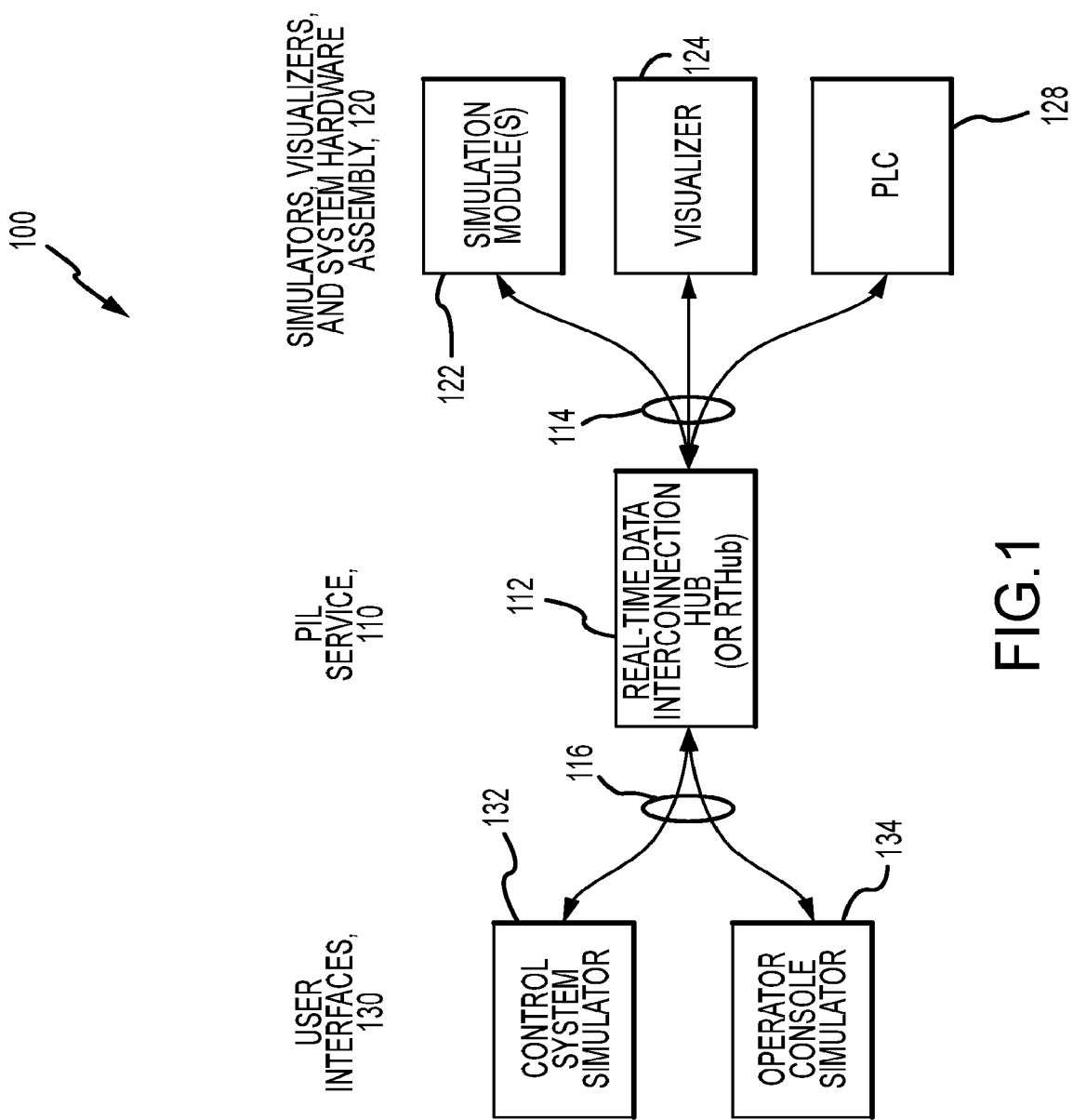
FIG. 1 is a functional block diagram of a simulation or testing system of the present description that includes an implantation of a soft-real-time hub (RTHub) providing data transport in a PIL environment.

FIG. 1 illustrates a simulation or testing system 100 of the present description that includes a PIL service 110 implemented via a new RTHub or soft-real-time hub 112 along with a simulator, visualizer, and system hardware assembly 120 and a set of user interfaces 130. The hub 112 is shown to include interfaces and/or data connections 114 for a simulation module 122, a visualizer 124 (e.g., Unity, Unreal Engine 4, or tool useful for simulations/testing from other vendors), and a PLC 128 of the assembly 120 and further to include interfaces and/or data connections 116 for the simulation graphical user interface (GUI) 132 and the operator's console 134 of the user interfaces set 130. The system 100 with hub 112 is designed to provide increased determinism in system HILs and/or PILs. The system 100 may be provided within nearly any computing device such as a computer running a commonly-available OS such as Microsoft Windows (but may be configured for porting to other OS such as Linux). FIG. 1 is useful for providing an overview of a portion of the simulation or testing system 100 that may be provided on a simulation computer showing the system architecture, capabilities, and features of the hub application 112.

As shown, the hub 112 connects system hardware 128, simulators and visualizers 122 and 124, and user interfaces 132, 134 for a complete processor-in-the-loop (PIL) system simulation (or a hardware-in-the-loop (HIL) simulation) via interfaces/connections 114, 116 between the hub 112 and these components of the system 100. The hub 112 is configured to interface with existing simulation tools such as already developed simulators 122 and operator consoles 134 to offer flexibility. It can also leverage a simulator GUI 132 user interface and configuration file template to aid in usability. The hub 112 is highly modular, which enables new connectors to be added with minimal impact to the architecture of the system 100. The hub 112 in some embodiments is designed to be highly parallel to minimize the impact of adding additional connectors to overall performance of the system 100.

Figure 4:
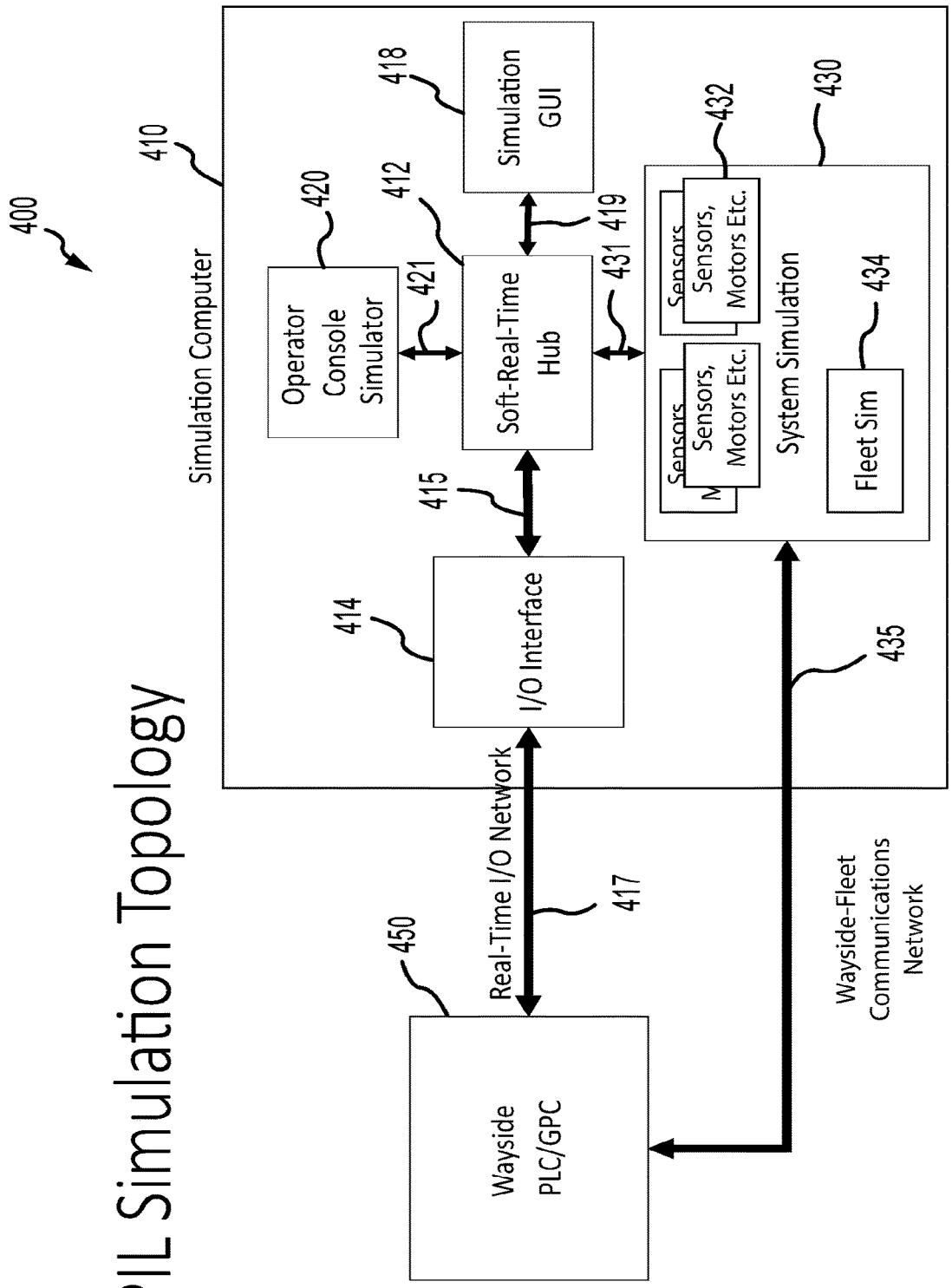
FIG. 4 is a functional block diagram of a simulation or testing system of the present description showing a simulation computer running or providing a soft-real-time hub for use in facilitating testing a control system.

An overarching design goal for the RTHub 112 is to provide a central timing engine for simulations while also providing a transparent interface to the control system (or other device) under test (not shown in FIG. 1 but provided in FIG. 4). In order to be transparent to the control system under test, the hub connectors emulate the I/O network interface (e.g., EtherCAT, Allen-Bradley Ethernet/IP, and the like). This transparent interface allows for a PIL test of production software, without any special modifications to interface with a simulation.

The hub 112 can run as a standalone application (as shown in FIG. 1), loading in a configuration file from the command line, or it can be launched from a special build of a simulation hub (not shown) associated with the simulation GUI 132. The simulation GUI 132 enables forcing and real-time viewing of data as the data moves through the system 100. When using the simulation GUI 132 (in some non-limiting implementations), an edit option is, in some embodiments, exposed to enable real-time mode. Selecting this option causes the simulation hub to launch the RTHIL hub 112 and connection. Note, the control GUI 132 can start/stop/pause the hub simulation as well as providing high-level log visualization while the hub 112 is running to aid in debugging, and the GUI 132 can also communicate the current status of the hub 112 to a user.

With regard to architecture of the hub 112, the hub 112 is a highly modular and parallel program (run by a processor(s) of a simulation computer/computing device) that is configured to offer the flexibility to simulate and evaluate show and ride systems. The added benefit of the real-time support provided by the hub 112 enables better exploration of communication patterns and system reaction to unexpected inputs. The RTHub 112 has features that enable the integration of two or more subsystems of a device/system under test into one application to simplify pre-integration development (e.g., integration of a park ride HIL or PIL and that park ride's accompanying show HIL or PIL into one application). The hub 112 typically will include the following features in its architecture: (a) configuration files for the simulation in the hub's memory (or memory accessible by the hub program during its execution) (the configuration file is for system execution, with GUI tables dynamically generated from the topology described in the configuration files); (b) a user interface; (c) a soft-real-time engine (or a timing engine); (d) connector and channel structures; and (e) connectors.

With regard to the configuration files aspect of the hub architecture, the hub 112 uses simulation configuration files as the basis for configuring the hub 112. These files may function in both the simulation GUI 132 and the hub 112. The hub 112 and GUI 132 applications, though, may support some different features. As a result, the base configuration file may be edited or modified to ensure compatibility or to achieve a desired functionality. With regard to the user interface of the hub architecture, the hub 112 can use a remote control interface through the simulation GUI application. This provides an easy-to-use service. For example, UDP can be streamed from the hub 112 to the simulator GUI 132 as shown at 116 to update values while control commands are sent over TCP.

The soft-real-time engine (or the timing engine) may be considered to be the heart of the hub 112. This custom engine is a dedicated thread that accurately measures processor performance and notifies other threads at user-specified intervals. Peak performance in one prototype was 1 kHz with less than 100 microseconds of jitter, which outperforms many existing Windows timers. While the timing engine is able to perform at 1 kHz, many systems are not able to match this performance. In some implementations, the hub 112 may be configured to only support a global system update rate. However, other implementations of the hub 112 will support multiple scan rates. For example, the user may set the scan rate, and the scan rate can run faster or slower to simulate different conditions.

The architecture of the hub 112 includes connector and channel structures that provide the backbone of data transfer inside the hub 112. When a configuration file is loaded, memory is allocated for each channel. This includes details about each channel and a data buffer. The channels are logically grouped under their owning connector. Connectors interact with this data structure in a producer-consumer design pattern. The owning connector acts as the producer, in some embodiments, reading data in and storing it. The connectors referencing the data act as the consumers in such embodiments. There can be multiple consumers to a single producer, as specified by the configuration file. The timing engine provides reading and writing locks, in some preferred implementations, that ensure there are no access issues on the shared memory. There is also a check to ensure a single produce for a given channel of data.

The connectors in the hub's architecture are included to provide an interface to various other control systems (e.g., other ride and show control systems in the park attraction control system-under test examples). This includes PLCs and existing simulation tools (as shown in assembly 120 in FIG. 1 as well as the operator's console 134). Connectors can be added to the system 100, with compartmentalization of the scope of each connector. Connectors may exist in their own thread, enabling maximum parallelism and performance. The timing engine of the hub 112 provides global synchronization, and key synchronization can be provided in some embodiments by an abstract connector class.

Figure 2:
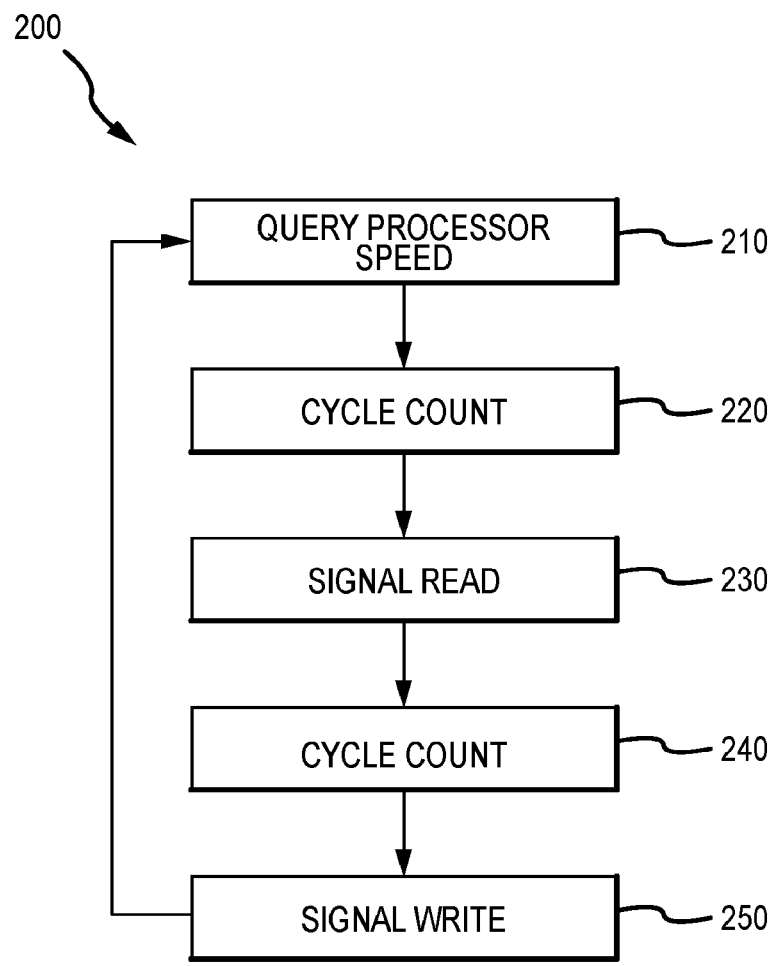
FIG. 2 is a functional block diagram of a timing engine such as may be run within the RTHub of the system of FIG. 1.

FIG. 2 is a functional block diagram of functional processes 200 provided by a timing engine such as may be run within the RTHub 112, in a very parallel manner, of the system 100 of FIG. 1 to trigger signals to each connector and/or to notify all threads of timing to provide synchronization. The timing engine relies on a single thread running at maximum priority on the Windows OS. Due to the lack of a real-time operating system, Windows requires a cycle count to be accurate. The engine, at 210, queries processor speed to ensure it is counting the correct amount of cycles at 220.

The engine then waits a period of time, such as for 50 percent of the slice to pass, and then triggers at 230 a read signal to each connector. This is done via a conditional variable and a mutex, enabling a low-latency, deterministic synchronization interface. Once the read signal is raised at 230, the timing engine resumes counting at 240 until it reaches the end of its slice and triggers the write at 250. This distinct two-phase system or process 200 carried out by the timing engine addresses shortcomings in some connectors where a read and write cannot be combined in one call. Note, the timing engine (or the process 200) may be user configurable such as by allowing the user to specify time they want things to run at (e.g., by using a timing trigger/period other than 50 percent of a slice, which can be extended to trigger for multiple scan rates in a single system raising additional signals to trigger specific connectors).

Figure 3:
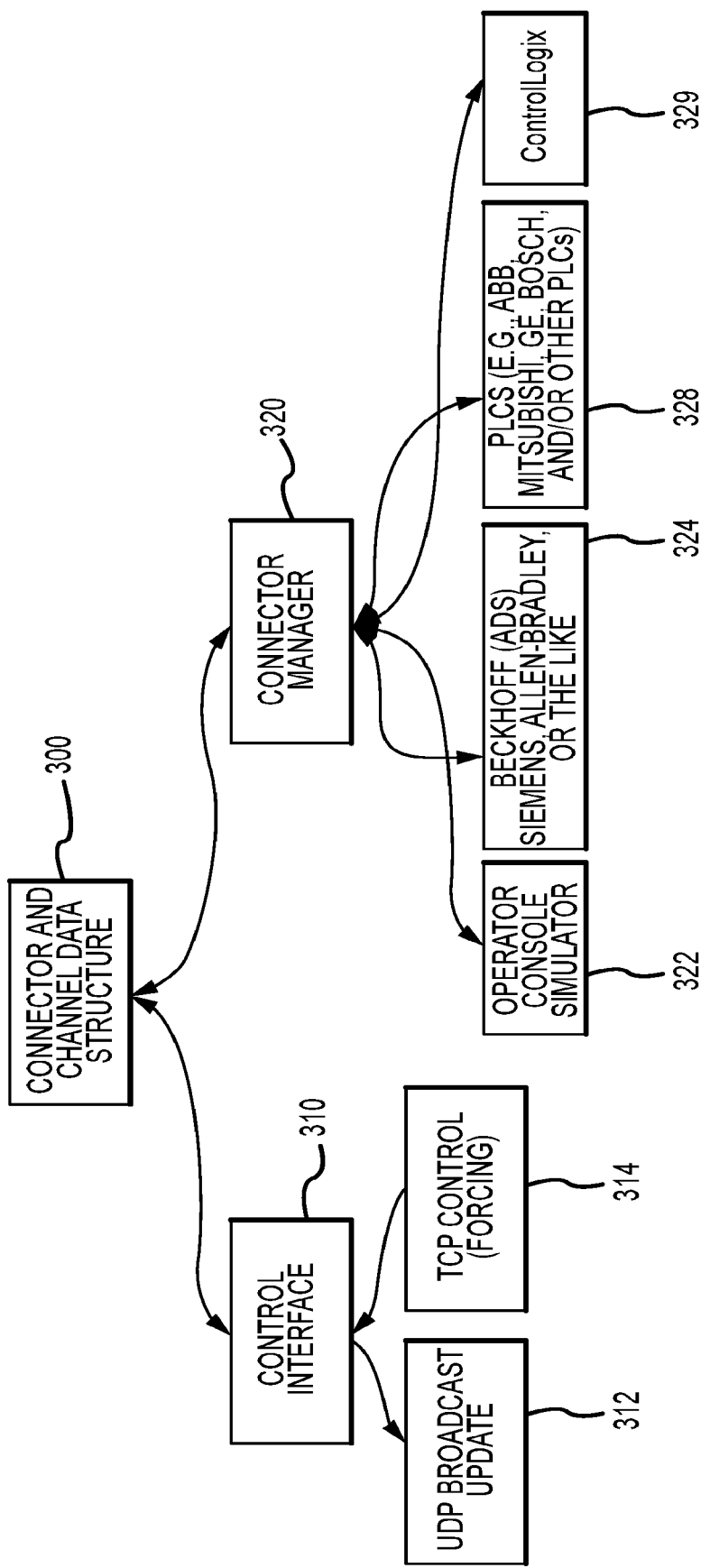
FIG. 3 illustrates schematically an exemplary memory structure of the RTHub of the system of FIG. 1.

FIG. 3 illustrates schematically an exemplary design of a connector and channel data structure 300 that may be used by a soft-real-time hub of the present description (such as hub 112 of FIG. 1). The connector and channel memory 300 is shared by the following two main subsystems: memory 310 used by the control interface and memory 320 used by the connector manager. The control interface subsystem of the hub 112 provides an interface to the simulation GUI 132. The UDP broadcast aspect sends periodic updates 312 at a slower rate than the overall system (but still in sync with the read-write locks). The UDP interface only reads data. The TCP application control enables forcing, and this is an event-driven system that handles passing forcing data 314 to the connectors (also in sync with the read-write locks). Slower speed may be used to reduce computational overhead, which provides enough speed to be fluid and responsive to a human user while being slow enough that it is not consuming excess resources.

The connector manager of the hub 112 is the main system to interact with the connector and channel data structure 300. The connector manager acts as an initializer and data pass-through to each connector. During the initialization, connector-specific configuration data (as shown in FIG. 3 for the operator console simulator 134 at 322, for the Beckhoff (ADS) at 324, for the PLCs 128 at 328, and for the Allen Bradley ControlLogix at 329) is read from the main data structure 300. In implementing the system, the PLCs may be provided by a variety of manufacturers including, but not limited to, Siemens, Allen-Bradley, Beckhoff, ABB, Mitsubishi, Schneider Electric, GE, Bosch, and the like. Once setup is complete, the connector manager passes pointers to the data structure to the respective connectors (with such pointers stored at 322, 324, 328, and 329 in the connection manager portion 320 of the memory or data structure 300). From this point, the connector manager may only interact with channel and connector data if the simulation is started, stopped, or paused.

FIG. 4 is a functional block diagram of a simulation or testing system 400 of the present description showing a simulation computer 410 (which may be nearly any computing device with a processor(s) (not shown but well understood) running or providing (e.g., executing code or running loaded software) a soft-real-time hub 412 for use in facilitating testing a control system 450. Here, the control system 450 is shown to be a wayside ride control system written and designed for controlling a theme or amusement park ride (and its show elements in some cases), but the control system 450 may take the form of nearly any software and hardware used to control or operate a device or system that can have its operations and communications related to such operations effectively simulated.

To this end, the system 400 further includes a system simulator or simulation module 430 in communication with the hub 412 as shown at 431 and with the control system 450 as shown at 435. The system simulator 430 includes one-to-many ride element modules (or elements of another simulated device or system other than a ride) 432, which may take the form of software that simulates a system's components during its operations such as ride doors, lifts, and the like for a vehicular ride. One or more of the ride element modules 432 may also be real world operational elements operating based on control signals from the control system 450 and providing real world output signals/data, and the ride elements 432 may be added and removed (and developed) in a modular manner with ready plug-and-play in the system 400 via the hub 412.

In this way, emulated or real world ride elements/modules 432 provide I/Os from a controlled system to the hub 412 via connection 431. The system simulator 430 may also include a fleet simulator 434 providing a simulation of a higher scale operation of the controlled system (here a park ride) such as simulation of fleet movements/operations for a plurality of ride vehicles in this ride control testing example. Significantly, the fleet (high scale) simulator 434 and the ride element simulators (or real world components) 432 are operating or running (and also providing I/O or communications regarding their operations) at the real world clock as is the device under test, i.e., the control system 450.

The system 400 further includes an operator's console simulator 420 in communication with the hub 412 as shown at 421 and a simulation GUI 418 in communication with the hub 412. These two user interface components 418, 420 allow operators to drive the test by providing input and view data flow and also to monitor and control operation of the control system 450 by providing input. The simulation GUI 418 has access to all data during operation of the system 400 to test the control system 450. The system 400 further includes an I/O interface 414 that is provided between the control system 450 and the hub 412 to communicatively connect the control system 450 to the hub 412 with communication links 415 and 417 as shown. The I/O interface 414 is configured to allow real-time I/O such that the device under test (e.g., control system 450) believes it is plugged into network and/or communicating in real-time with a controlled system (e.g., ride elements or the like).

In this regard, the system 400 is configured to provide a simulation of a control system network 435. This is achieved through configuration and operations of the hub 412 and a real-time I/O network provided by communication links 415, 417, 419, 421, and 431. As discussed above, the hub 412 controls and provides soft-real-time I/O in part by using a time-step in providing data transport throughout the real-time I/O network, and this may be based on a user-defined time interval such as 5 milliseconds or the like chosen to control processing and communications overhead while maintaining the "real-time" aspect of the data transport during testing by system 400. The hub 412 is adapted to allow nearly anything to be plugged into the system 400 including but not limited to the components shown in FIG. 4 such as more controller, more or different simulators 432, and so on, and the hub 412 handles all communications to and from these components and the control system 450 under test.

One unique feature of the system 400 is that the system 400 and its hub 412 provide the flexibility to support multiple different simulators 432, 434 in a system simulator or simulators 430. Early in a design, it may be impractical to have individual models for each ride element or subsystem/system component or to understand dynamics of components (such as to understand vehicle dynamics). The system simulation assembly or simulator 430 (or plant model) provides the high-level operation of the system under test (e.g., a ride or other park attraction), and it also offers a deterministic simulation. Integrating this existing simulation assembly 430 with PIL development can reduce costs and provide additional data earlier in the testing or simulation process. Use of the system simulation assembly 430 can further improve safety by the introduction of failures such as in a Monte-Carlo random manner. Since the system simulation assembly 430 contains both fleet simulation module 434 and ride element models with modules 432, the stacking of failures can identify logical gaps or processing delays in the control system (device/system under test) 450.

Figure 5:
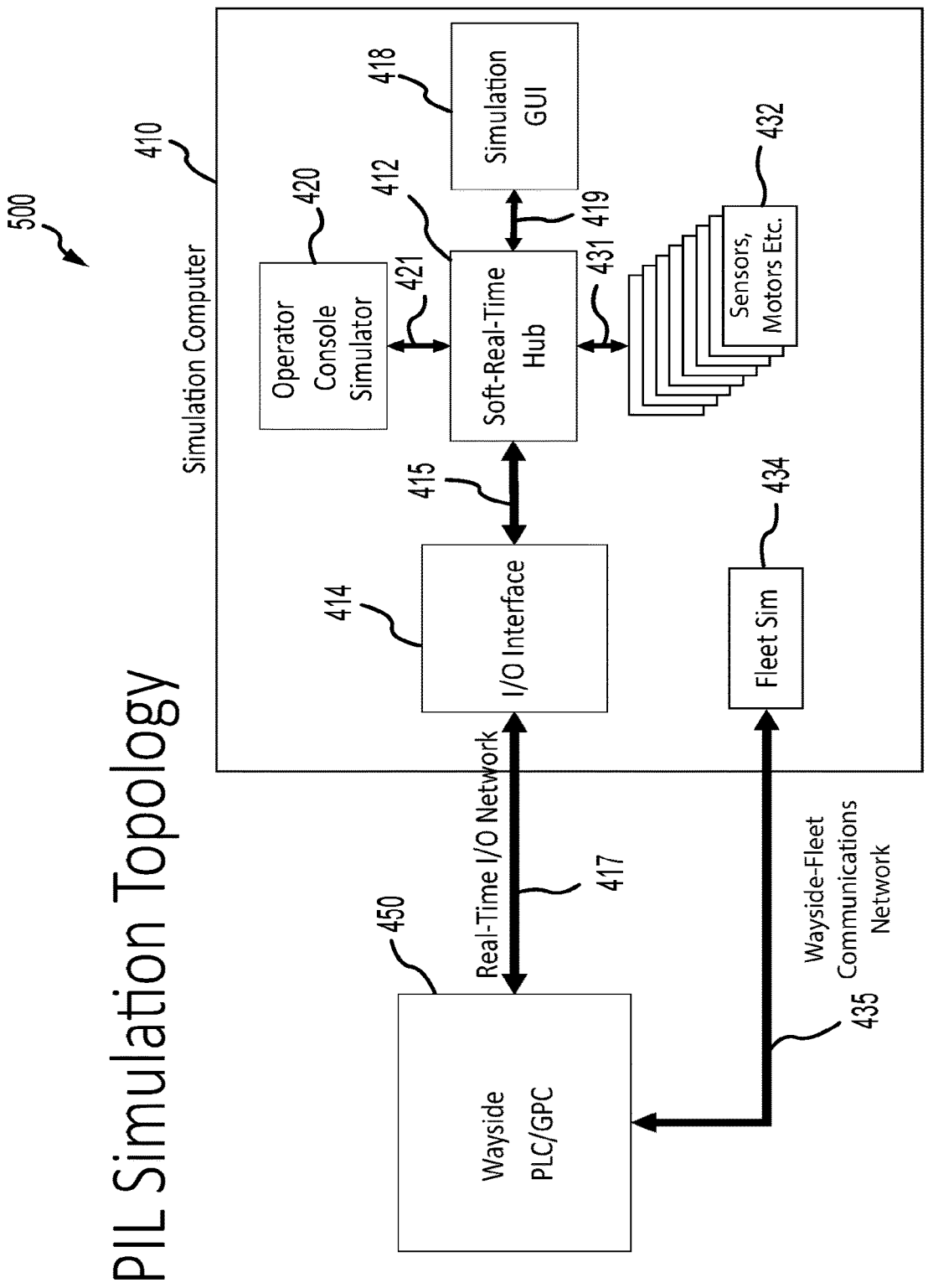
FIG. 5 is a functional block diagram similar to FIG. 4 of another embodiment of a simulation or testing system.

FIG. 5 illustrates another design for (or use case of) a simulation or testing system 500. The system 500 includes many of the same components as system 400, with like numbering used for these common elements. The system 500 differs in that the modular ride element modules (or real world elements) 432 are each directly plugged into or communicatively linked at 431 to the hub 412 while the fleet or higher level simulator 434 is communicatively linked to the control system 450 under test only via simulated control system network 435.

In both systems 400 and 500 when used for ride control system testing, the ride element modules 432 may be provided by or include models for an attraction bus controller, ride sensors, ride doors, brakes, chains, station gates, and other system elements/subsystems. The specific number and type of such models will vary with the system being controlled (e.g., with a particular ride or park attraction). These models account for all sensors and actuators that accompany each element, such as pneumatic systems that often accompany ride doors. Furthermore, the ride elements or modules 432 and the fleet simulator 434 can be contained inside a complete system simulation 430 as shown in FIG. 4. Ride element models may be simple logical applications or complex programs (e.g., Simulink programs or the like). Since each ride element or module 432 can connect independently to the hub, the design of the hub 412 and system 400 provides the ability to swap models as they are developed.

The operator's console simulator 420 may be configured to handle all buttons, switches, indicators, and gauges that an operator may use when interfacing or interacting with the control system 450 under test in system 400 or 500. This enables testing of power up sequences and system (e.g., ride) operation. Actions can be scripted to aid in automating common operator sequences. The simulation GUI 418 exists, in some embodiments, in a separate process (as shown) to preserve the real-time nature of the hub 412. This interface 418 may be configured to show data as it moves through the system 400 and also provides an interface for an operator (e.g., test engineer or the like) to force signals to simulate faults or other specific conditions for the system/device simulated by modules 432, 434 or assembly 430. The ability to force signals improves safety and reduces costs by testing specific failure cases before components of the simulated system are manufactured in some cases (e.g., before a vehicle or a wayside for a ride or attraction (in the park example) are manufactured).

Figure 6:
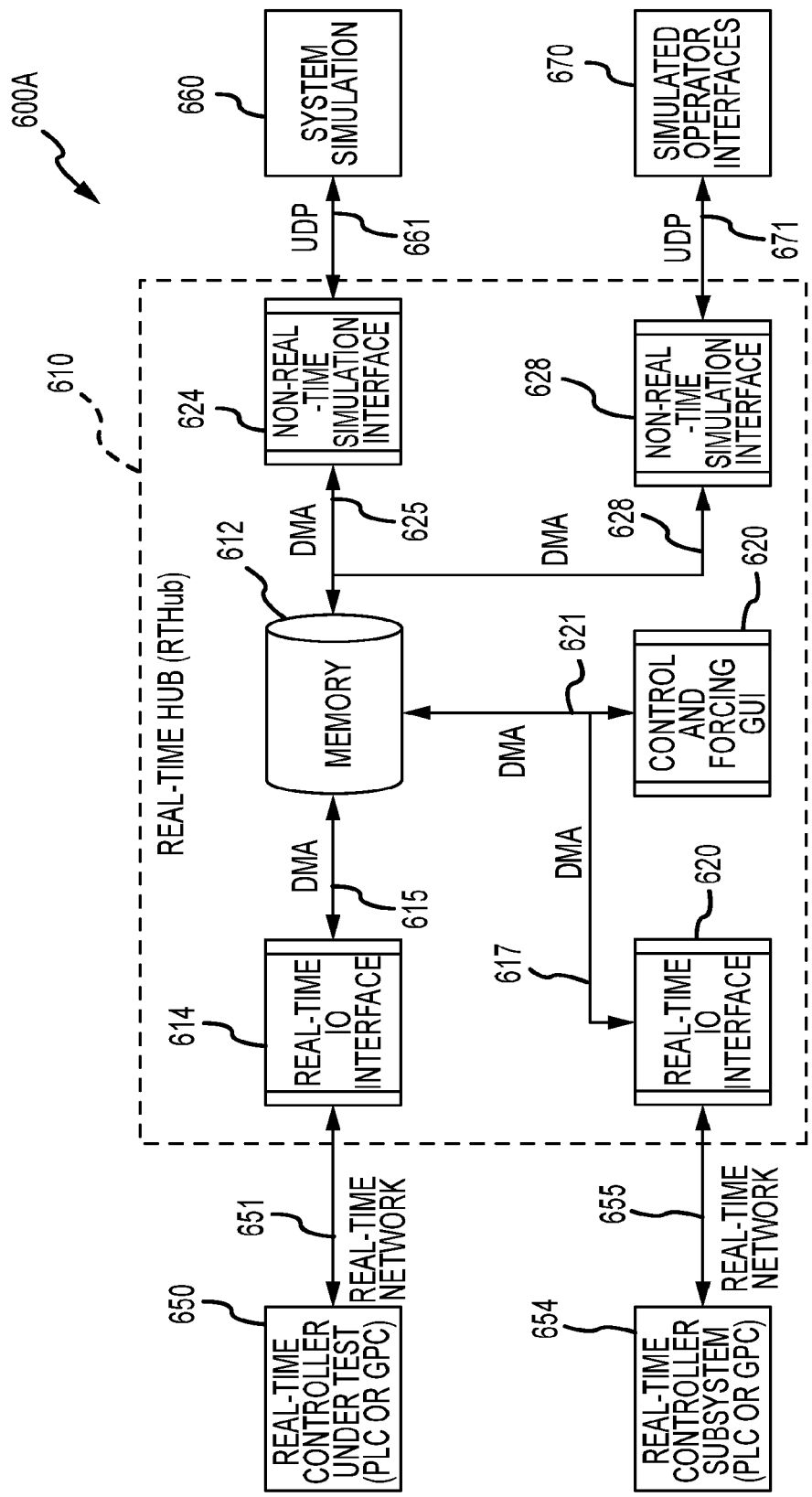
FIG. 6 is a schematic diagram showing data flow provided during operations of a soft-real-time hub as described herein such as the hub of the system of FIG. 1.

FIG. 6 illustrates a simulation or testing system 600A during a first operational state or mode showing real-time data flow achieved with a soft-real-time hub 610 of the present description (e.g., as may be running on a PC or other computing device). The system 600A is shown to include a real-time controller under test 650 and one or more real-time subsystems 654 of the controller 650 along with the hub 610 and a system simulation component 660 and one or more simulated operator interfaces 670. As discussed above, it is desirable to provide real-time communications in the system 600A, and this achieved in part by providing a real-time I/O interface 614 to communicatively couple the controller 650 and the controller subsystem 654 as shown with real-time network links 651, 655 to the hub 610 (note, the real time network components 651, 655 may take a wide variety of forms such as Rockwell Ethernet/IP, EtherCAT, DeviceNet, or the like). Each of the interfaces 614 and 616 provides direct memory access (DMA) to the hub's memory 612 as shown with links 615, 617 (e.g., for memory transfer internal to the hub 610 or, more precisely, the hub application.

As shown, data in the system 600A can move to and from all devices. Each interface and network is designed to support this bidirectional data movement. Some interfaces, such as to the control and forcing GUI 620, have limited data sent back to memory 612 (e.g., only forces). Most external interfaces both read and write multiple channels from and to memory 612. It is possible, however, to have a connection that only works in one direction.

Figure 7:
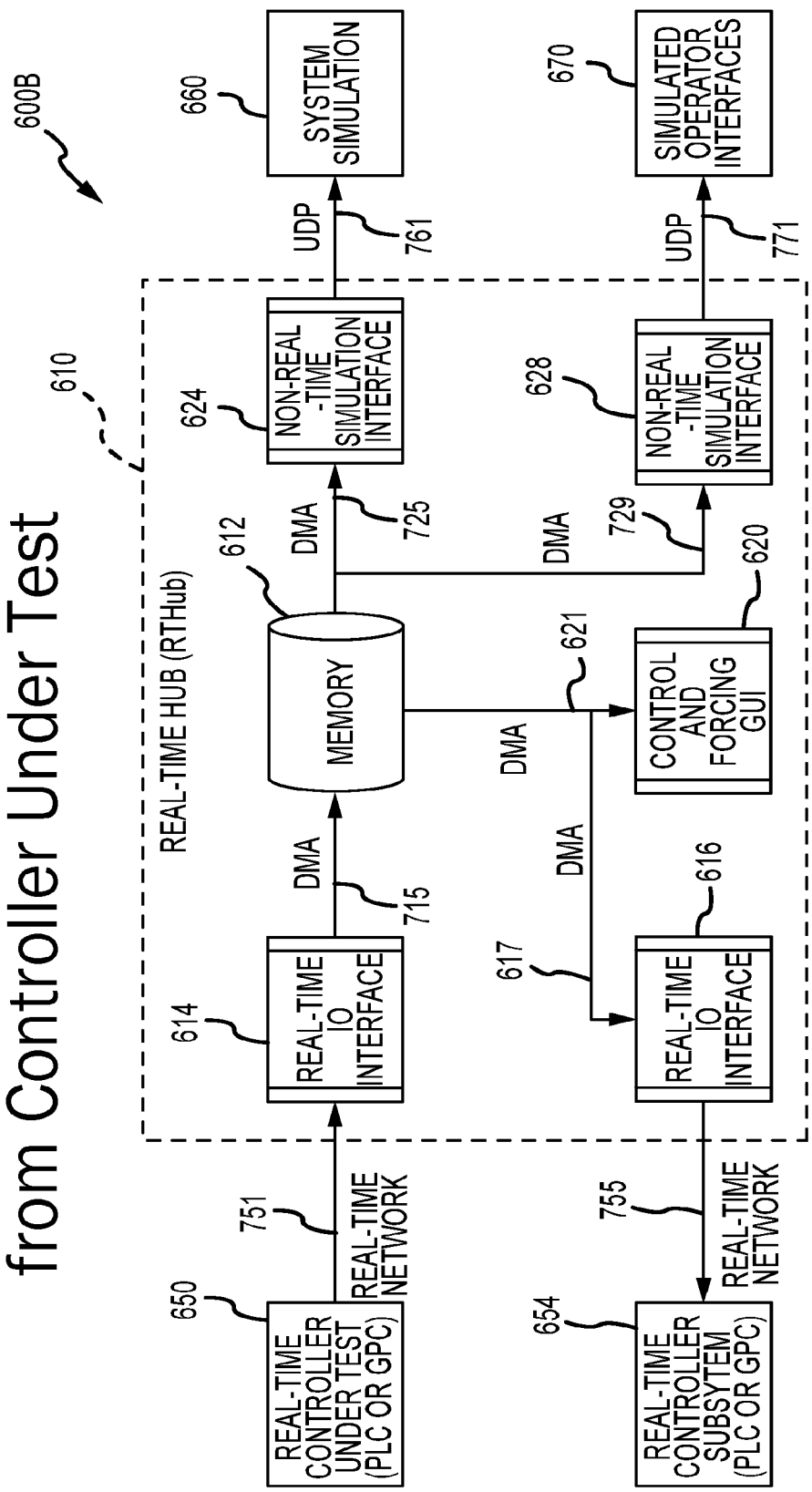
FIG. 7 is a schematic diagram similar to that of FIG. 6 showing data flow for the hub from controller under test.

FIG. 7 illustrates the system 600B operating in a different state or mode. Particularly, FIG. 7 shows real-time hub data flow from the controller 650 when it is under test by system 600B. As shown, data is ingested by the controller 650 and directed as shown at 751 to the I/O interface 614 of the hub 610 and then to memory 612 via DMA 715. The hub 610 then operates to route the data to other components, at a regular interval (i.e., the hub 610 maintains timing of communications), including to the subsystems 654 via DMA 617 to the I/O interface 616 and real-time network communications 755, to the control and forcing GUI 620 via DMA 621, to the system simulator 660 via DMA 725 to the simulation interface 624 and UDP communications 761 to the simulator 660, and to the simulated operator interfaces 670 via the DMA 720 to the simulation interface 628 and UDP communications 771 to the interfaces 670. The hub 610 can support multiple instances of the real-time I/O interface as shown at 614 and 616 and of the non-real-time simulation interface as shown at 624 and 628.

Figure 8:
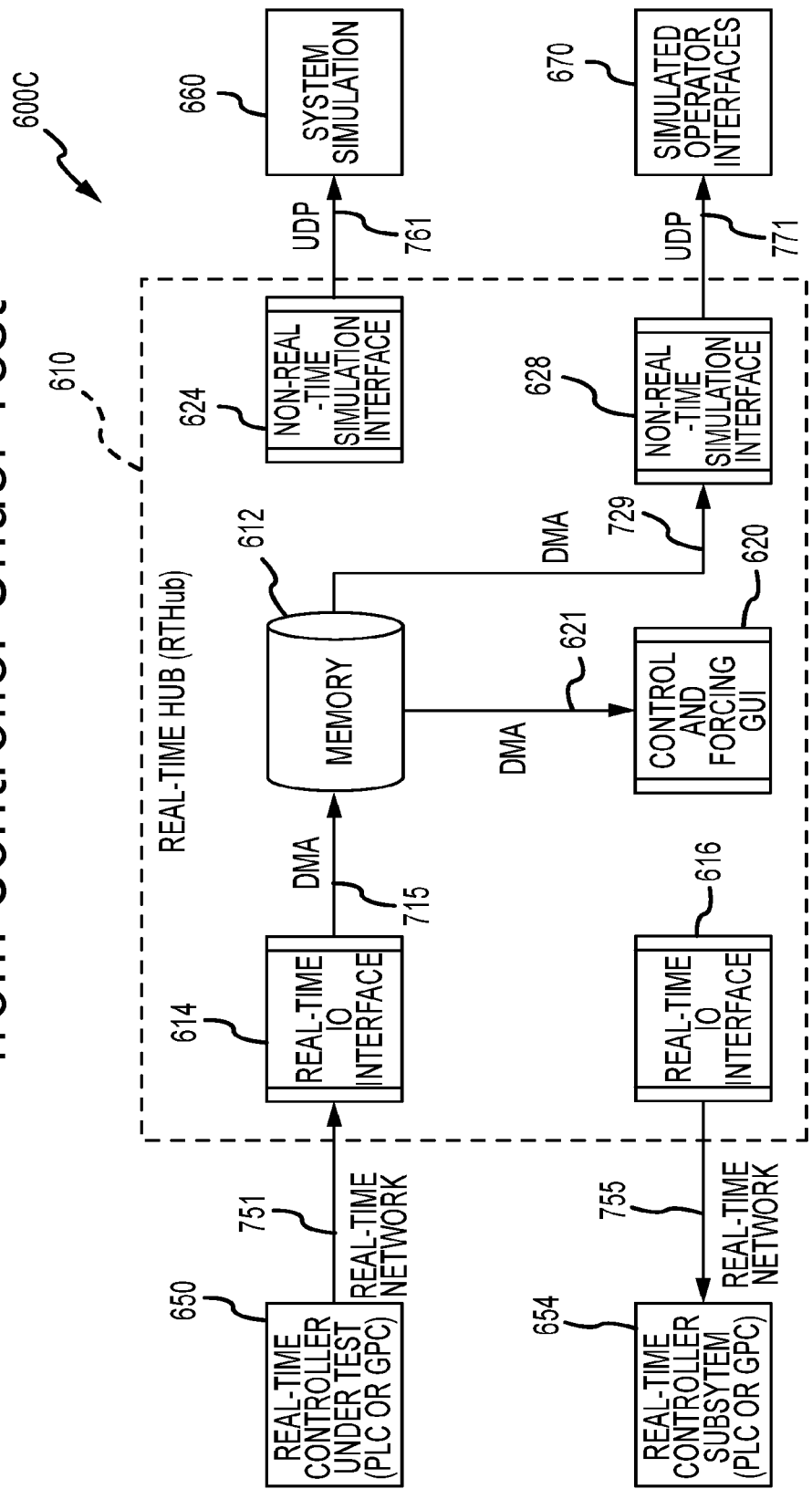
FIG. 8 is a schematic diagram similar to that of FIGS. 6 and 7 showing hub data routing from controller under test.

FIG. 8 illustrates the system 600C operating similar to the system 600B with the controller 650 under test. The system 600C has differing data flow with the hub 610 operating to only route (at a regular interval) data to devices that need the data (i.e., only devices that need the data are updated), even though communication is typically maintained to all claims of the hub 610. As shown, the controller 650 transmits ingested data at 751 over the real-time network to the interface 614, which provides it to the memory 612 via DMA 715. In this example, the control and forcing GUI 620 and the simulated operator interfaces 670 need the data. Hence, the hub 610 operates to communicate the ingested controller data to the GUI 620 as shown with DMA 621 and to the operator interfaces 670 as shown with DMA 729 to the simulation interface 628 and its UDP communications 771 to the operator interfaces 670. Note, the real-time I/O interface 616 and the non-real-time simulation interface 624 are intentionally shown as not being connected because they do not need the data being discussed in FIG. 8 (or operating mode of system 600 C), but the external systems are still connected and receiving data that they should be receiving.

Figure 9:
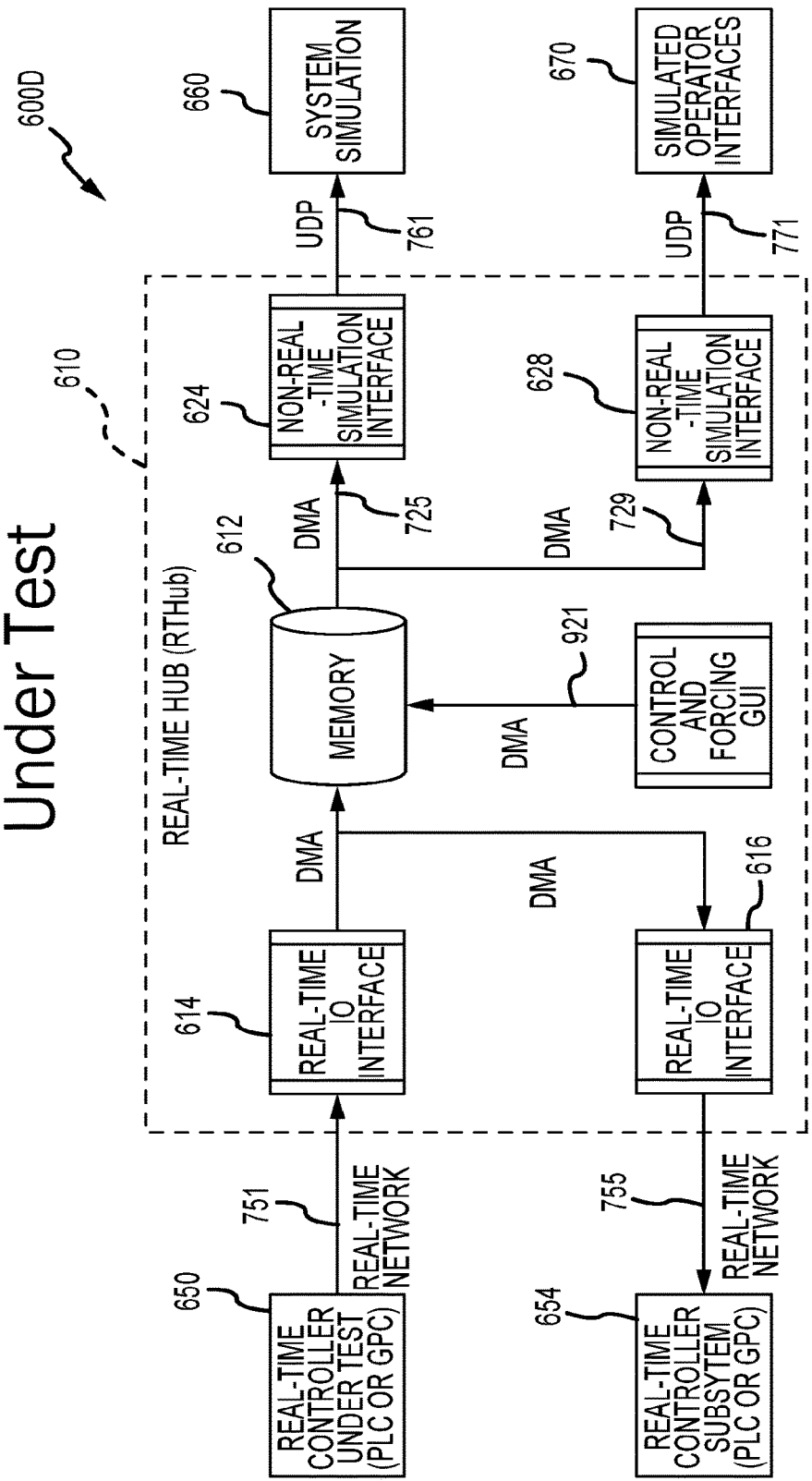
FIG. 9 is a schematic diagram similar to that of FIGS. 6-8 showing hub data routing with force from controller under test.

FIG. 9 illustrates the system 600D operating under yet another operating state or mode with the controller 650 under test and with forcing by the control and forcing GUI 620. As shown, data is ingested by the controller 650 under test, and this data is provided by the controller via communications over the real-time network as shown at 751 to the I/O interface 614 to the hub memory 612 (for communication to all components or just the ones that need it as discussed above). Hence, under forcing, the system 600D maintains all connections and continues to get the latest, unmodified values from the controller 650 under test.

Further, a user/operator of the system 600D forces a value by modifying or replacing some data as shown DMA 921 storing this data in the hub memory 612. The hub 610 then operates, at regular intervals, to communicating the forced signal to the system simulation 660 through interface 624 as shown with DMA 726 and UDP communications 761, to the operator interface 670 through interface 628 as shown with DMA 729 and UDP communications 771, and to the controller subsystems 654 via I/O interface 616 as shown with DMA 917 and real-time network communications 755.

Communications are also furthered or provided via the hub 610 by including, in the hub 610, non-real-time simulation interfaces 624 and 628 for the system simulator 660 and the simulated operator interfaces 670, and these components are communicatively coupled as shown with links 661, 671 (such as using user datagram protocol (UDP) communications). The interfaces 624 and 628 are also linked to the memory 612 with DMA as shown with links 625, 629. The hub 610 further includes a control and forcing GUI 620 to allow an operator of the system 600A to control the testing of controller 650 and its subsystems 654 during operations of the system 600A, and the GUI 620 has, as shown with link/arrows 621, DMA communications with the memory 612 of the hub 610 (as well as with interface 616 to the controller subsystems 654).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the above description teaches aspects of the new hub for use in testing ride/attraction systems, but, with this exemplary use, many other use cases for the hub will be evident to those skilled in the art including nearly any industrial control system. The new hub and simulation system architecture allows for the recording and playback of the data going between the PLC and the hub such that the data can be played back without a PLC. The inventors have shown this feature(s) can be used to, for example, play back ride data into a show simulation to enable the show engineers to program their part of the system without having to physically procure a ride PLC (as ride and show portions of a system often use different hardware). Another use case is that one could sample network traffic directly as it comes into the PC, using a custom-written tool or a generally available tool such as Wireshark or the like, to look at the actual network packets and inspect what was being sent between the PLC and its I/O at the byte level.

Additionally, it should be understood from the above discussion that the hub provides improved discipline and logging in simulations/testing of control systems. The hub ensures timely completion of its communication tasks. Failure to meet timing is logged, and, then, the system moves on. This is an expansion on the expected performance of a real-time system. The above description explains the advantage of the soft-real-time hub in networking. While this use case is believed important, other forms of communication may be added to a system with the new hub. These new communications may include USB, high performance serial bus (such as Apple's FireWire or the like), audio, parallel port, serial port, and so on.

The fleet simulator (e.g., element 434 in FIG. 4) is configured to simulate a group of independent control systems or robots that communicate with the master control system. The fleet simulator may be provided as a simulation engine that is separate from the hub. As shown in FIG. 4, it may be part of a larger system simulation that is connected, but it could also be completely isolated, depending on the system topology.

As taught herein, the soft-real-time hub provides enhanced abilities to log data for later analysis. First, the hub provides logging data (at a user-controlled rate, either continuous at a user-defined interval or when something changes) from the main hub memory. This may be used, for example, to facilitate logical debugging and/or to provide system performance metrics. Second, the hub may be used to provide similar logging at each of the connectors. This feature may be used to help with interface debugging for the control system and be useful for confirming that data is sent and is in the correct format. It is similar to adding a network tap to a connection. The new hub and system architecture described herein enables this functionality. For example, the hub can provide this feature or as a benefit of running on a standard OS an application such as Wireshark may be used to capture this data without additional hardware.

We claim:

1. A method of testing a controller of a real-world system, comprising:
    communicatively coupling a simulator assembly for the real-world system, a simulation GUI, and the controller of the real-world system;
    first communicating data from the simulator assembly to the simulation GUI for processing for user visualization; and
    second communicating data from the controller of the real-world system to the simulator assembly to simulate operations of the real-world system,
    wherein the first and second communicating are performed based on a real world clock at predefined time intervals.

2. The method of claim 1, wherein the predefined intervals are set by querying processor speed to determine an amount of cycles to count, first performing a cycle count to determine a first waiting period and then triggering a read signal to connectors for the simulator assembly, the simulation GUI, and the controller, and second performing a cycle count to determine a second waiting period and then triggering a write signal to the connectors.

3. The method of claim 1, wherein the second communicating comprises providing an I/O interface coupled to the controller with direct memory access (DMA) to data output by the simulator assembly stored in a data structure using the predefined time intervals.

4. The method of claim 1, wherein the first communicating comprises providing a simulation interface communicatively linking the simulation GUI with a data structure storing data output from the simulator assembly and control signals from the controller and then providing the simulation interface with DMA to the data structure using the predefined time intervals.

5. The method of claim 1, further comprising communicatively linking a simulation control and forcing console or GUI to the controller, the simulation GUI, and the simulator assembly and third communicating forcing input from the simulation control and forcing console or GUI to the simulator assembly, based on the predefined time intervals, to modify operations of the simulator assembly to control testing of the controller.

6. The method of claim 1, further comprising logging at least a portion of the data from the first and second communicating at a user-controlled rate to facilitate debugging or to provide system performance metrics.

7. A method of testing a controller of a system, comprising:
    communicatively coupling a simulator assembly for the system, a simulation GUI, and the controller of the system;
    first communicating data from the simulator assembly to the simulation GUI for processing for user visualization; and
    second communicating data from the controller of the system to the simulator assembly to simulate operations of the system,
    wherein the first communicating comprises providing a simulation interface communicatively linking the simulation GUI with a data structure storing data output from the simulator assembly and control signals from the controller.

8. The method of claim 7, wherein the first communicating further comprises providing the simulation interface with DMA to the data structure using the predefined time intervals.

9. The method of claim 7, wherein the predefined intervals are set by querying processor speed to determine an amount of cycles to count, first performing a cycle count to determine a first waiting period and then triggering a read signal to connectors for the simulator assembly, the simulation GUI, and the controller, and second performing a cycle count to determine a second waiting period and then triggering a write signal to the connectors.

10. The method of claim 7, wherein the second communicating comprises providing an I/O interface coupled to the controller with DMA to data output by the simulator assembly stored in a data structure using the predefined time intervals.

11. The method of claim 7, wherein the first and second communicating are performed based on a real world clock at predefined time intervals.

12. The method of claim 7, further comprising communicatively linking a simulation control and forcing console or GUI to the controller, the simulation GUI, and the simulator assembly and third communicating forcing input from the simulation control and forcing console or GUI to the simulator assembly, based on the predefined time intervals, to modify operations of the simulator assembly to control testing of the controller.

13. The method of claim 7, further comprising logging at least a portion of the data from the first and second communicating at a user-controlled rate to facilitate debugging or to provide system performance metrics.

14. A method for testing a real-world control system, comprising:
    providing a communication link with a software-based real-time hub that is adapted for communicatively coupling with the real-world control system to provide a real-time I/O network for the real-world control system;
    with a simulator in communication with the software-based real-time hub, simulating operations of a system controllable by the real-world control system; and
    with the software-based real-time hub, controlling communications between the simulator and the real-world control system by storing data and transmitting the data with timing controlled by a timing engine, and
    wherein the communication link appears to the control system to be a communications link to the real-world system controllable by the control system.

15. The method of claim 14, wherein the timing set by the timing engine is a time interval or step, wherein the time interval or step is a default value or is user-definable, and wherein the time interval or step is determined on an ongoing basis by the timing engine and is used by the software-based real-time hub to trigger and track the communications to and from the control system and the simulator.

16. The method of claim 14, wherein the timing is dynamically updated by the timing engine querying processor speed to determine an amount of cycles to count, first performing a cycle count to determine a first waiting period and then triggering a read signal to each connector controlled by the software-based real-time hub, and second performing a cycle count to determine a second waiting period and then triggering a write signal to each connector controlled by the software-based real-time hub.

17. The method of claim 14, wherein the software-based real-time hub provides as part of the providing the communication link a I/O interface emulation with direct memory access (DMA) to access the data stored in the memory.

18. The method of claim 14, further comprising, with a simulation graphical user interface (GUI) and a simulation interface, communicatively linking the simulation GUI with the memory, wherein the software-based real-time hub provides DMA to the simulation interface to provide the simulation GUI with the data stored in the memory, whereby the simulation GUI has access to control signals generated by the control system and data generated by the simulator in response to the control signals.

19. The method of claim 14, further comprising, with a simulation control and forcing console or GUI communicatively linked to the software-based real-time hub, receiving the data stored in the memory based on the timing and forcing input to modify operations of the simulator to control testing of the control system.

20. The method of claim 14, wherein the simulator comprises a plurality of modular components for simulating subsystem or elements of the system controllable by the control system and wherein each of the plurality of modular components is separately pluggable and unpluggable to the software-based real-time hub.

* * * * *